United States Patent [19]

Mikalsen

[11] Patent Number: 4,742,364

[45] **Date of Patent: * May 3, 1988**

[54] INK JET APPARATUS AND METHOD EMPLOYING PHASE CHANGE INK

[75] Inventor: Arthur Mikalsen, Carmel, N.Y.

[73] Assignee: Dataproducts Corporation, Woodland Hills, Calif.

[ * ] Notice: The portion of the term of this patent subsequent to Sep. 2, 2003 has been disclaimed.

[21] Appl. No.: 935,645

[22] Filed: Nov. 26, 1986

Related U.S. Application Data

[63] Continuation of Ser. No. 661,701, Oct. 16, 1984, abandoned.

[51] Int. Cl.[4] .......................... G01D 9/00; G01D 15/16

[52] U.S. Cl. .......................... 346/140 R; 400/126; 346/1.1

[58] Field of Search .......................... 346/140 PD, 140 IS, 346/140 R, 75, 1.1; 400/126; 106/20, 30, 31

[56] References Cited

U.S. PATENT DOCUMENTS

| | | | |
|---|---|---|---|
| 3,653,932 | 4/1972 | Berry et al. | 346/1.1 X |
| 4,178,595 | 12/1979 | Jinnai et al. | 346/140 PD |
| 4,462,035 | 7/1984 | Koto | 346/76 PH |
| 4,609,924 | 9/1986 | DeYoung | 346/140 PD |

OTHER PUBLICATIONS

Owens, "New Ink-Writing Methods for Graphic Recording", Instruments & Control Systems, vol. 38, pp. 100-102, Jul. 1965.

*Primary Examiner*—E. A. Goldberg
*Assistant Examiner*—Mark Reinhart
*Attorney, Agent, or Firm*—Woodcock Washburn Kurtz Mackiewicz & Norris

[57] ABSTRACT

Hot melt ink is maintained in a solid state. When ink is called for in the reservoir of a scanning imaging head, the head is moved to a position coupled to the solid state ink whereupon the ink is melted coupled into the reservoir of the imaging head.

11 Claims, 1 Drawing Sheet

INK JET APPARATUS AND METHOD EMPLOYING PHASE CHANGE INK

This is a continuation of application Ser. No. 661,701 now abandoned, filed 1/20/87 Oct. 16, 1984.

BACKGROUND OF THE INVENTION

This invention relates to an ink jet wherein the ink within the jet is of the phase change type which may be referred to as hot melt ink.

The phase change or hot melt ink of the type utilized in an ink jet is characteristically solid at room temperature. When heated, the ink will melt to a consistency so as to be jettable. A hot melt ink jet apparatus and method of operation are disclosed in copending application Ser. No. 610,627, filed May 16, 1984. The hot melt ink may be jetted from a variety of apparatus including those disclosed in the aforesaid copending application.

When employing ink in a liquid state, the delivery of ink is, of course, dictated by the liquid state. Typically, the ink is contained within a closed vessel of some sort prior to delivery to the ink jet. When employing hot melt ink, the delivery of the ink requires different solutions in order to provide a reliable supply and minimize operator intervention. At the same time, it is undesirable to heat an entire supply of hot melt ink at all times since the extended cooking of the hot melt ink may result in degradation of the ink.

In copending application Ser. No. 660,655, filed Oct. 15, 1984, a melt-on-demand system for supplying ink to a reservoir carried by an ink jet in an imaging head is disclosed. By melting the ink on demand, extended cooking of the ink is avoided as well as the resulting degradation of ink. The amount of ink which may be utilized in such a system is limited by the amount of ink which may be carried on imaging head.

SUMMARY OF THE INVENTION

It is an object of this invention to provide a hot melt ink delivery system where an operator handling of the ink is minimized.

It is a further object of this invention to provide a hot melt ink delivery system where an ink may be reliably supplied to the ink jet apparatus.

It is a further object of this invention to minimize extended heating and resulting degradation of the ink.

It is a still further object of this invention to provide a hot melt delivery system wherein a large supply of ink is provided without requiring operator intervention.

In accordance with these and other objects of the invention, ink in solid state form is stored at a fixed location and a movable imaging head comprises at least one ink jet and an associated reservoir. The imaging head is moved to a filling position adjacent to the fixed location where the ink is stored and the solid state ink is melted to a liquid state form to fill the reservoir of the imaging head. The moving of the head to a filling position, melting and the filling of the reservoir may be repeated on demand whenever ink is needed.

In a preferred embodiment of the invention, the solid state ink comprises a block of ink with a heating means in thermal communication with an extremity of the block. The block is advanced so as to be maintained in thermal communication with the heating means which is energized on demand when ink is required.

DETAILED DESCRIPTION OF PREFERRED EMBODIMENT

Figure 1:
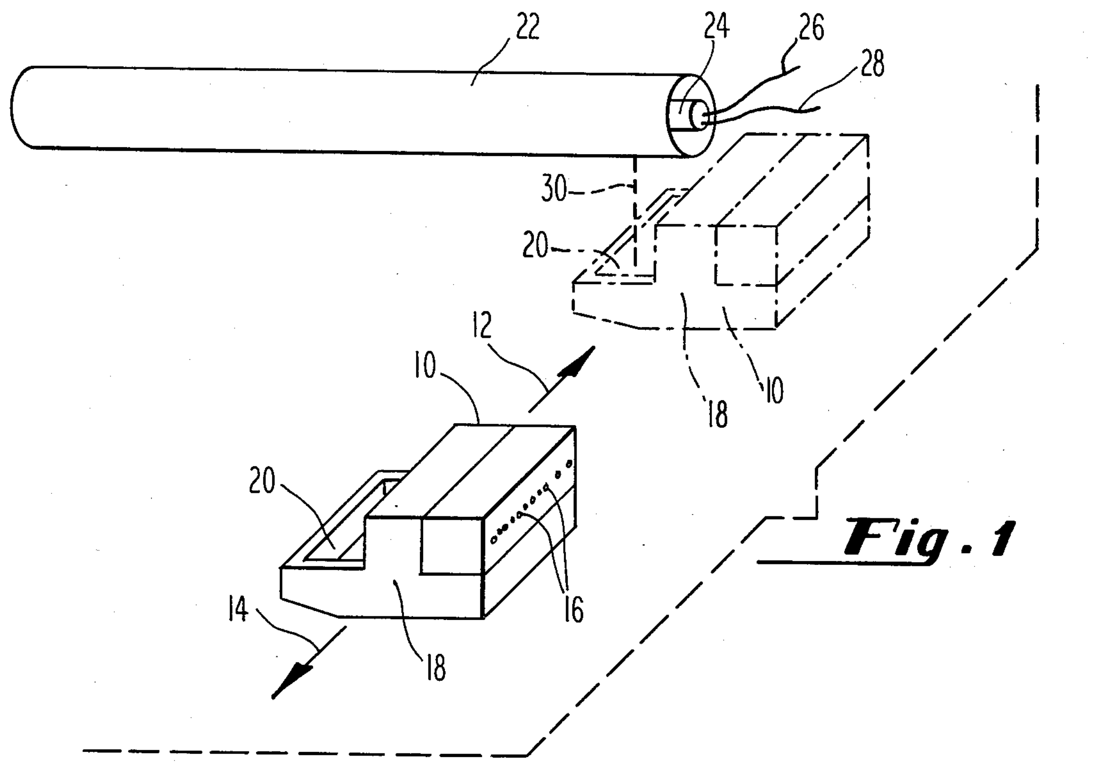
FIG. 1 is a perspective view of an ink jet apparatus representing a preferred embodiment of the invention.

Referring to FIG. 1, an ink jet apparatus is disclosed including a head 10 mounted for movement along a scanning path depicted by arrows 12 and 14. The head 10 includes ink jet imaging systems supplying an array of ink jets having orifices 16. The head 10 includes an on-board reservoir 18 supplied by a trough 20 located at the rear of the head 10.

The reservoir 18 is of a limited capacity. In other words, the reservoir 18 is capable of storing a volume of ink which is heated by a heater not shown so as to assure the operation of the ink jets for a reasonable period of time for a reasonable rate of printing. However, the volume of ink is limited.

In order to supply further ink to the reservoir 18 of the head 10 to the reservoir 20, the head 10 is capable of movement to a refill position shown in phantom. In the refill position, the head 10 is located below a supply of ink in solid state form which is capable of being converted to a melted state by heating. As shown, the supply comprises a tubular housing 22 with a heater 24 electrically supplied by leads 26 and 28. As shown in FIG. 1, the trough 20 when positioned adjacent to the supply of ink in tubular housing 22 is properly positioned so that melted ink may flow into the trough 20 along a path 30. In this manner, the reservoir 18 within the head 10 may be filled.

Once filled, the reservoir 18 and the head 10 are moved back into the scanning position away from the supply of hot melt ink. Periodically, it is necessary to move the head 10 back to the position shown in phantom in FIG. 1 so as to permit subsequent sequential melting of the hot melt ink within the tubular housing 22. It will therefore be appreciated that the volume of ink within the housing 22 when the supply is full substantially exceeds that volume of ink which is contained within the reservoir 18 of the head 10 at any given time.

Figure 2:
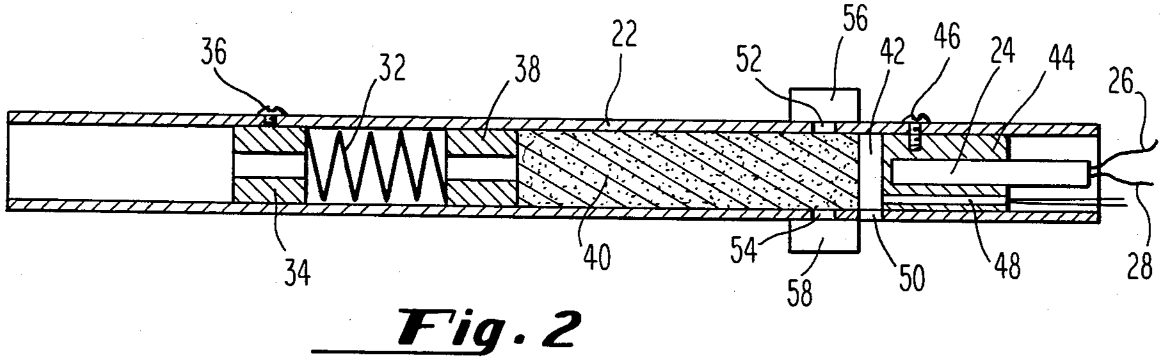
FIG. 2 is a sectional view of the ink supply of FIG. 1.

Referring now to FIG. 2, the tubular housing 22 is shown as housing a helical spring 32 which abuts a fixed member 34 secured to the housing 22 by screw 36. The other end of the spring 32 abuts a movable insert 38 which is in contact with one extremity of a block of ink 40 in solid state form. The other end of the block 40 abuts a groove 42 juxtaposed to the heater 24 which is enclosed within a housing 44 held in place by a screw 46. The groove 42 allows ink to flow into the opening 50. The housing 44 includes a thermistor 48 or other temperature sensing element.

As the heater 24 is elevated in temperature, the extremity of the block 40 abutting the plate 42 will melt. The melted ink then flows through the groove 42 and into the aperture 50 in the tubular housing 22. It is flow from the aperture 50 which creates the flow of melted ink 30 shown in FIG. 1.

As also shown in FIG. 2, the housing 22 includes apertures 52 and 54 associated with a light source 56 and a light detector 58. When a sufficient quantity of ink 40 is present to block the light from the source 56 from being detected by the detector 58, the resulting signal generated by the detector indicates an adequate quantity of ink 40. However, when the quantity of ink 40 is no longer capable of blocking the detector 58, the detector 58 will indicate a low supply. This will be more fully described in connection with FIG. 3.

Figure 3:
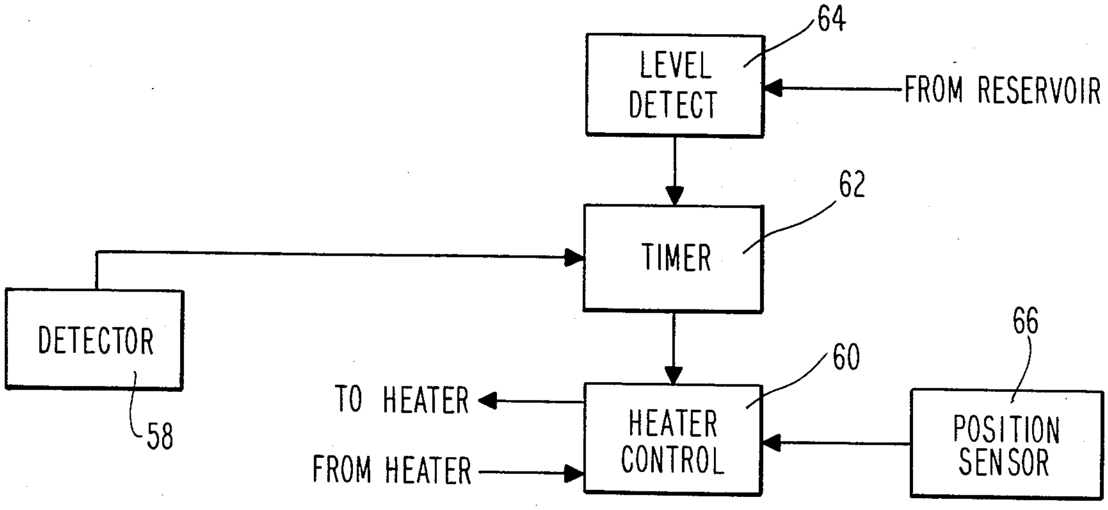
FIG. 3 is a block diagram of control apparatus for the apparatus shown in FIG. 1.

Referring now to FIG. 3, a heater control 60 energizes and de-energizes the heater 24. In order to control the temperature of the heater 24, the heater control 60 is responsive to a signal from the thermistor 48.

Preferably, the heater 24 is energized for a predetermined length of time whenever a refill of ink is called for in the reservoir 18. This predetermined length of time is under the control of a timer 62 which supplies an input to the heater control. It is, of course, important to only set the timer to initiate heating when ink is called for in the reservoir 18. This is determined by a level detect circuit 64 which receives a suitable level indicating signal from the reservoir. However, the timer 62 can only be set when the detector 58 indicates an adequate supply of ink 40 as shown in FIG. 2.

For this invention, it is important that the melting only be initiated when the head 10 is in the proper position beneath the tubular housing 22. For this purpose, a position sensor 66 enables the heater control when the head 10 is in proper position.

Particular details of the imaging head are disclosed in copending application Ser. No. 336,603, filed Jan. 4, 1982, and Ser. No. 576,582, filed Feb. 3, 1984, as well as Ser. No. 661,794, filed Oct. 17, 1984, which are assigned to the assignee of this invention and incorporated herein by reference. The particular hot melt ink which may be utilized is disclosed in U.S. Pat. No. 4,390,369 and copending U.S. applications Ser. No. 644,542, filed Aug. 27, 1984, Ser. No. 610,627, filed May 16, 1984 and Ser. No. 565,124, filed Dec. 23, 1983, which are assigned to the assignee of this invention and incorporated herein by reference.

The reservoir 18 may comprise elements disclosed in copending U.S. patent application Ser. No. 661,925, filed Oct. 16, 1984 and a buffer reservoir may be utilized as disclosed in copending U.S. patent application Ser. No. 661,034, filed Oct. 15, 1984, both of which are assigned to the assignee of this invention and incorporated herein by reference.

Although a preferred embodiment of the invention has been shown and described, it will be understood that other embodiments and modifications will fall within the true spirit and scope of the invention as set forth in the appended claims. For example, it is possible to eliminate the heater plate 42 and utilize a supply of solid state ink which contains a heater element extending throughout the length of the ink. Where such an ink supply is utilized, the spring 62 for advancing the ink may be eliminated. On the other hand, where a heater plate is utilized, it may be desirable to provide means other than the spring 32 to advance the ink. It will also be appreciated that it may be desirable to provide for separability between the housing 22 and the heater housing 44 as well as the optical detecting system including the light source 56 and the light detector 58. It will also be appreciated that the housing 22 may be rotated 90° for topographical purposes.

I claim:

1. a method of operating an ink jet apparatus comprising the following steps:
storing ink in solid state form at a fixed location;
scanning at least one ink jet and an associated reservoir;
sequentially melting portions of said ink; and
periodically moving said at least one ink jet and associated reservoir to said position adjacent said fixed location for receiving sequentially melted portions of ink.

2. The method of claim 1 including repeating the aforesaid steps.

3. The method of claim 1 wherein the volume of ink stored in solid state form exceeds the volume of ink in said reservor.

4. The method of claim 1 including the step of inhibiting melting of said solid state ink when said at least one ink jet and associated reservoir are not adjacent said fixed location.

5. Ink jet apparatus comprising:
a scanning ink jet head including a reservoir and at least one ink jet;
a fixed solid state ink supply;
means for heating and melting said solid state ink and flowing said melting ink into said reservoir when said head is coupled to said ink supply; and
means for inhibiting heating and melting when said head is not coupled to said ink supply.

6. The ink jet apparatus of claim 5 wherein said solid state ink comprises a block.

7. The ink jet apparatus of claim 5 wherein said means for heating comprises a plate in thermal communication with an extremity of said block.

8. The ink jet apparatus of claim 6 including means for advancing said block to maintain said block in thermal communication with an extremity of said block.

9. A method of operating an ink jet apparatus comprising the following steps:
storing ink in solid state form at a fixed location;
scanning at least one ink jet in an associated reservoir;
moving said at least one ink jet and associated reservoir to a position adjacent said fixed location on demand;
melting said solid state ink;
filling said reservoir with said melted ink; and
inhibiting melting of said solid state ink when said at least one ink jet and associated reservoir are not adjacent said fixed location.

10. The method of claim 9 including repeating the aforesaid steps.

11. The method of claim 9 wherein the volume of ink stored in solid state form exceeds the volume of ink in said reservoir.

* * * * *

UNITED STATES PATENT AND TRADEMARK OFFICE
CERTIFICATE OF CORRECTION

PATENT NO. : 4,742,364

DATED : May 3, 1988

INVENTOR(S) : Mikalsen

It is certified that error appears in the above-identified patent and that said Letters Patent is hereby corrected as shown below:

Column 1, line 6, please delete --1/20/87--.

Signed and Sealed this

Twenty-fifth Day of October, 1988

*Attest:*

DONALD J. QUIGG

*Attesting Officer*

*Commissioner of Patents and Trademarks*

UNITED STATES PATENT AND TRADEMARK OFFICE

CERTIFICATE OF CORRECTION

PATENT NO. : 4,742,364

DATED : May 3, 1988

INVENTOR(S) : Mikalsen

It is certified that error appears in the above-identified patent and that said Letters Patent is hereby corrected as shown below:

Column 4, line 45, please change the word "in" to --and--.

Signed and Sealed this

Seventeenth Day of January, 1989

*Attest:*

DONALD J. QUIGG

*Attesting Officer*

*Commissioner of Patents and Trademarks*